US008215938B2

(12) United States Patent
Iwata et al.

(10) Patent No.: US 8,215,938 B2
(45) Date of Patent: Jul. 10, 2012

(54) TIRE FORMING MOLD

(75) Inventors: Masaki Iwata, Osaka (JP); Shigemi Ohsuna, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 12/859,894

(22) Filed: Aug. 20, 2010

(65) Prior Publication Data

US 2011/0048613 A1 Mar. 3, 2011

(30) Foreign Application Priority Data

Aug. 25, 2009 (JP) ................. 2009-194116

(51) Int. Cl.
*B29C 35/02* (2006.01)
*B29C 33/42* (2006.01)
(52) U.S. Cl. ........................................ 425/28.1; 425/35

(58) Field of Classification Search .................. 425/28.1, 425/35; 264/246
See application file for complete search history.

(56) References Cited

U.S. PATENT DOCUMENTS

| | | | | |
|---|---|---|---|---|
| 1,940,077 A | * | 12/1933 | Coe | 264/246 |
| 3,769,123 A | * | 10/1973 | Botts et al. | 264/326 |
| 4,198,774 A | * | 4/1980 | Roberts et al. | 152/523 |
| 4,279,286 A | * | 7/1981 | Merli et al. | 152/523 |
| 4,823,856 A | * | 4/1989 | Roberts | 152/523 |
| 5,263,525 A | | 11/1993 | Yamashita | |
| 5,454,894 A | * | 10/1995 | Makinson et al. | 425/28.1 |

FOREIGN PATENT DOCUMENTS

JP 05-8612 1/1993
* cited by examiner

*Primary Examiner* — James Mackey
(74) *Attorney, Agent, or Firm* — Fish & Richardson P.C.

(57) ABSTRACT

A tire forming mold is disclosed in which letters and lines having different colors are formed in a side wall portion of the tire.

3 Claims, 7 Drawing Sheets

Fig.4
(a)
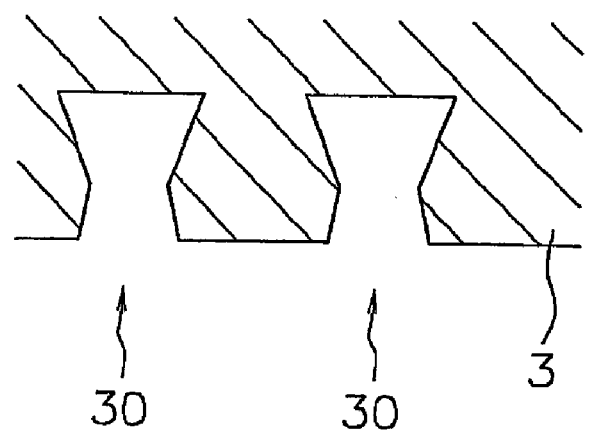
(b)
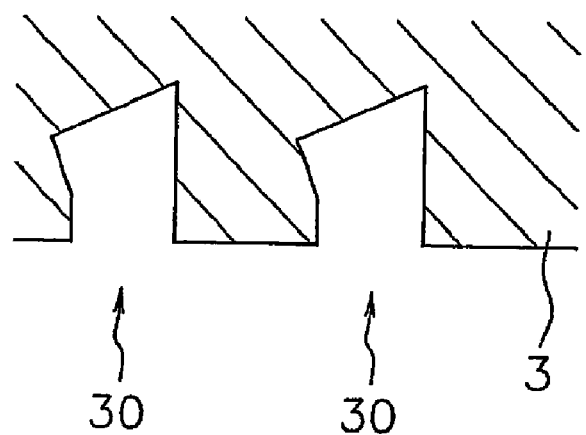

Fig. 9
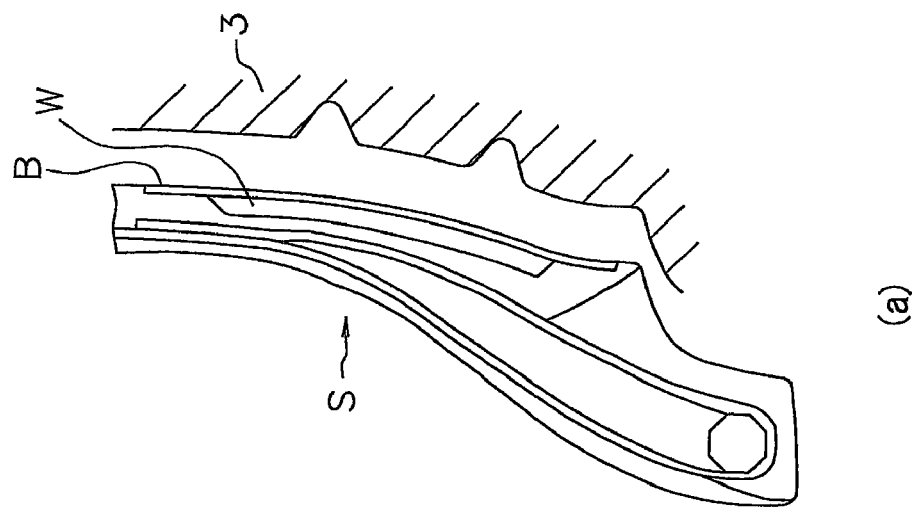
(a)
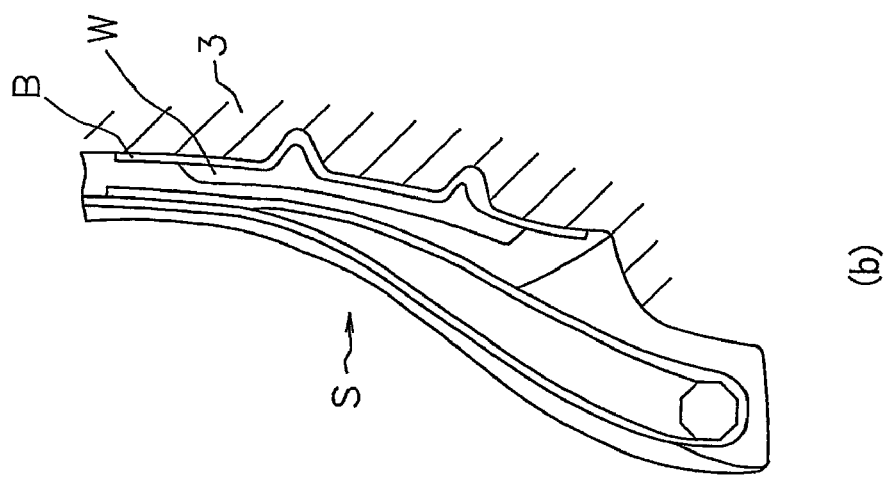
(b)
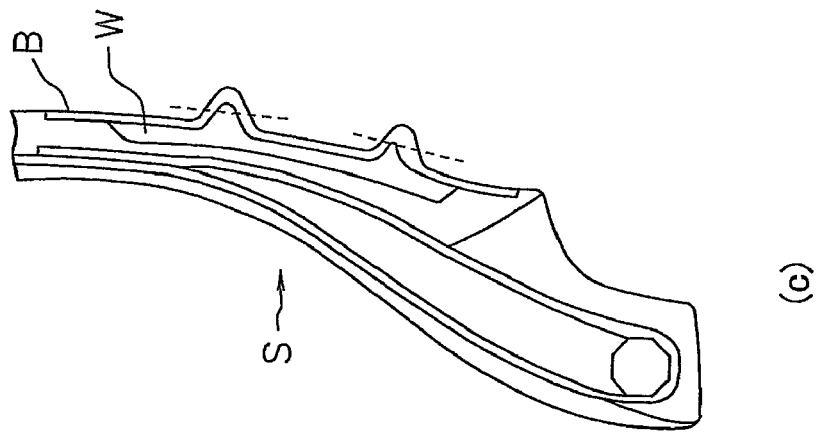
(c)

TIRE FORMING MOLD

BACKGROUND OF THE INVENTION

1. Field of the Invention

The present invention relates to a tire forming method and a tire forming mold, and more particularly to a forming method of a tire in which letters and lines having different colors are formed in a side wall portion, and a tire forming mold.

2. Description of the Related Art

Conventionally, for the purpose of enhancing a fashion property or the like, there has been known a pneumatic tire (hereinafter, sometimes referred simply to as a tire) in which letters and lines having different colors are formed in a side wall portion. Particularly, the pneumatic tire in which the letters and lines of a white rubber are formed on an outer surface of the side wall portion may be called a white letter tire, a white line tire or the like.

Japanese Unexamined Patent Publication No. 5-8612 describes a forming method of a pneumatic tire in which an embossed mark including a white letter is formed in a side wall portion of a tire. Specifically, a green tire is formed by burying and attaching a white rubber body in a concave portion provided in a side wall rubber body for forming a side wall portion, and laminating a thin and black rubber sheet on a surface thereof, and the white rubber body is exposed by pressing a metal mold having a concavo-convex portion coinciding with a pattern shape such as the letter to the side wall portion at a time of vulcanization forming, applying a buff treatment to a convex portion of the concavo-convex surface formed in the side wall portion, and removing the black rubber sheet.

Patent document 1: Japanese Unexamined Patent Publication No. 5-8612

SUMMARY OF THE INVENTION

FIGS. 9A to 9C show a state in which a metal mold is pressed to a side wall portion, and a concavo-convex surface is formed in the side wall portion. As shown in FIG. 9A, when a metal mold 3 is pressed to a side wall portion S in which a white rubber W and a black cover rubber B are laminated, from an outer side, as shown in FIG. 9B, the white rubber W and the black cover rubber B flow into a concave portion of the metal mold 3, so that a convex portion is formed on a surface of the side wall portion S. The white rubber W can be exposed to the surface by buffing a leading end of the convex portion formed as mentioned above on a buff surface shown by a broken line in FIG. 9C.

However, there is a case that an amount of the internal white rubber W becomes less than a desired amount in some formed convex portion, for example, a lower convex portion in two convex portions shown in FIGS. 9B and 9C. Even if the convex portion mentioned above is buff treated, there is a case that a lot of black cover rubber B is left, so that the letters and the line widths such as the white letters and the white lines get out of order and are not clearly displayed. It is thought that this is caused by a case that the concave portion of the metal mold is tapered, so that the white rubber W can not flow into the concave portion appropriately.

The present invention has been made in view of the above circumstances, and an object thereof is to provide a tire forming mold and a tire forming method such that letters and lines of a formed tire can be clearly displayed in the case of forming the tire in which the letters and the lines having different colors are formed in a side wall portion.

Means for Solving the Problems

The object mentioned above can be achieved by the present invention described as follows.

In other words, in accordance with the present invention, there is provided a tire forming mold for vulcanization forming by being brought into contact with an outer surface of a tire which is provided with a side rubber layer of a first color arranged in an outer side of a carcass ply of a side wall portion, a different color rubber layer of a second color arranged in adjacent to an outer side of the side rubber layer, and a cover rubber layer of the first color arranged in adjacent to an outer side of the different color rubber layer, the tire forming mold comprising:

a rubber inflow portion for forming a protrusion portion in an outer surface of the tire by inflowing the different color rubber layer and the cover rubber layer, in the contact surface with the tire, wherein a cross sectional shape of the rubber inflow portion is constructed by a neck portion extending from an inflow port, and a head portion enlarged from the neck portion.

A description will be given of an operation and an effect of the tire forming mold having the structure mentioned above. The tire forming mold according to the present invention is structured such as to vulcanization form by being brought into contact with the outer surface of the tire provided with the side rubber layer of the first color arranged in the outer side of the carcass ply of the side wall portion, the different color rubber layer of the second color arranged in adjacent to the outer side of the side rubber layer, and the cover rubber layer of the first color arranged in adjacent to the outer side of the different color rubber layer, and can form the tire in which the letters and the lines having the different colors are formed in the side wall portion. The tire forming mold according to the present invention is provided with the rubber inflow portion in the contact surface with the tire, and can form the protrusion portion on the outer surface of the tire by inflowing the different color rubber layer and the cover rubber layer. The cross sectional shape of the rubber inflow portion is constructed by the neck portion extending from the inflow port, and the head portion enlarged from the neck portion. As a result, the protrusion portion formed in the tire is formed such that the leading end portion is bulged. As mentioned above, since the rubber inflow portion is formed in such a manner as to be provided with the enlarged head portion from the neck portion, the rubber tends to flow into the head portion through the neck portion in comparison with the case of the conventionally known tapered shape as shown in FIG. 9A to 9C, and the rubber flow of the different color rubber layer in the neck portion becomes good. Accordingly, since the desired amount of different color rubber layer exists in the position formed by the neck portion of the rubber inflow portion, in the protrusion portion of the tire, the different color rubber layer is exposed to the surface in the desired aspect by buff treating at this position, and the letters and the lines of the tire after being formed are clearly displayed.

In the tire forming mold in accordance with the present invention, it is preferable that the head portion is formed into a round shape.

As long as the head portion is formed into the round shape, even if the head portion is formed into the enlarged shape from the neck portion, the protrusion portion formed in the tire can be easily drawn off from the rubber inflow portion at a time of drawing off the tire from the tire forming mold after the vulcanization forming, and the protrusion portion less gets chipped. Further, in the case that the head portion is formed into the round shape, the different color rubber layer tends to flow into the head portion, so that the rubber flow of the neck portion becomes better. As a result, the letters and the lines of the tire after being formed can be more clearly displayed.

The object mentioned above can be achieved by the present invention described as follows.

In other words, in accordance with the present invention, there is provided a tire forming method of vulcanization forming by arranging a side rubber layer of a first color in an outer side of a carcass ply of a side wall portion, arranging a different color rubber layer of a second color in adjacent to an outer side of the side rubber layer, and bringing an outer surface of a tire in which the cover rubber layer of the first color is arranged in adjacent to an outer side of the different color rubber layer into contact with a tire forming mold, wherein the tire forming mold is provided with a rubber inflow portion in a contact surface with the tire, and a cross sectional shape of the rubber inflow portion is constructed by a neck portion extending from an inflow port, and a head portion enlarged from the neck portion, and a protrusion portion is formed in the outer surface of the tire by inflowing the different color rubber layer and the cover rubber layer into the rubber inflow portion.

The operation and the effect of the tire forming method having the structure mentioned above have been already mentioned. According to the tire forming method of the present invention, the letters and the lines of the tire after being formed can be clearly displayed, in the case of forming the tire in which the letters and the lines having the different colors are formed in the side wall portion.

BRIEF DESCRIPTION OF THE DRAWINGS

FIGS. 4A and 4B are enlarged views of a substantial part of a tire forming mold according to another embodiment of the present invention;

FIGS. 9A to 9C are explanatory views for explaining a conventional tire forming method.

DETAILED DESCRIPTION OF THE PREFERRED EMBODIMENTS

Figure 1:
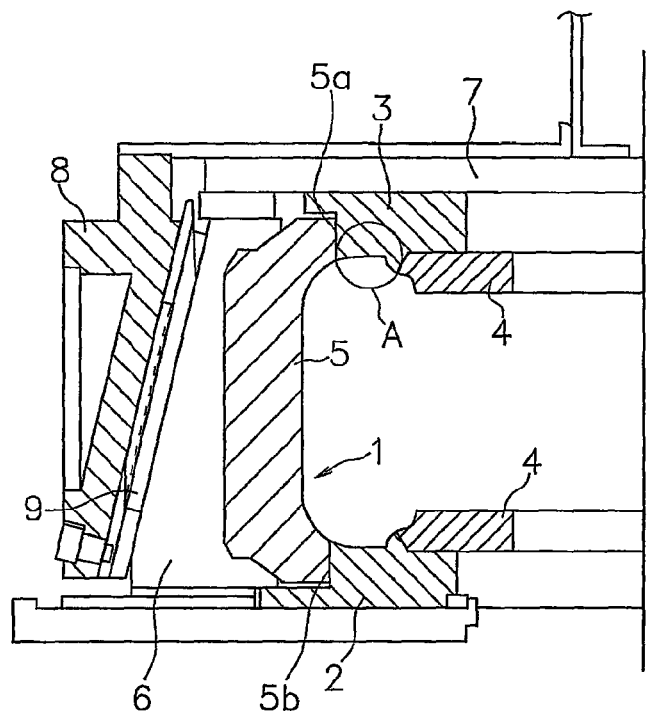
FIG. 1 is a vertical cross sectional view schematically showing an example of a tire forming mold according to the present invention.
Figure 2:
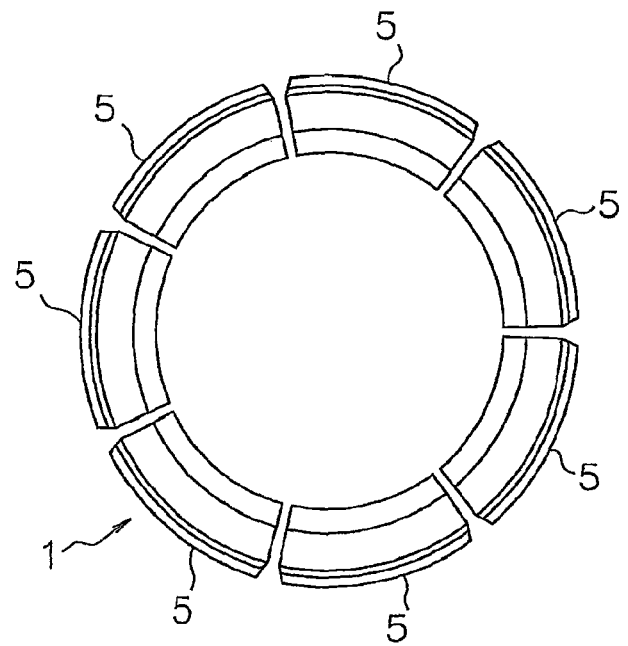
FIG. 2 is a plan view of a tread mold portion.

A description will be given below of an embodiment according to the present invention with reference to the accompanying drawings. FIG. 1 is a vertical cross sectional view schematically showing an example of a tire forming mold according to the present invention, and shows a mold clamping state. In FIG. 1, an unvulcanized tire (not shown) is set in such a manner that a tire axial direction is upside down, a right side in FIG. 1 is an inner side in a tire diametrical direction, and a left side in FIG. 1 is an outer side in the tire diametrical direction. FIG. 2 is a plan view of a tread mold portion 1.

The tire forming mold (hereinafter, sometimes referred simply to as "forming mold") is a segmented mold which is provided with a pair of side mold portions 2 and 3 forming outer surfaces of side wall portions of a tire, and a tread mold portion 1 fitted to outer sides in the tire diametrical direction of the side mold portions 2 and 3 at a time of mold clamping, and forming an outer surface of a tread portion of the tire. A bead ring 4 is provided in an inner side in the tire diametrical direction of the side mold portions 2 and 3, and is structured such that a bead portion of the tire can be fixed.

The tread mold portion 1 is constructed by a combination of sectors 5 which are divided in a tire peripheral direction as shown in FIG. 2, and each of the sectors 5 is structured such as to be displaceable in the tire diametrical direction. In the mold clamping state, the sectors 5 get together and are connected as a circular ring shape by bringing end surfaces into contact with each other. In a mold open state, the sectors 5 displace to an outer side in the tire diametrical direction and separate from the side mold portions 2 and 3. In the present embodiment, there is shown an example in which the tread mold portion 1 is divided into seven sections, and peripheral lengths of the sectors 5 are approximately equal to each other, however, in the present invention, the number of division of the tread mold portion is not particularly limited and the peripheral lengths of the sectors may be different from each other.

As a raw material of the tread mold portion 1, aluminum is exemplified. The aluminum is a concept including not only a pure aluminum raw material but also an aluminum alloy, for example, there are listed up Al—Cu based, Al—Mg based, Al—Mg—Si based, Al—Zn—Mg based, Al—Mn based, and Al—Si based alloys. Further, as a raw material of the side mold portions 2 and 3, a steel material can be exemplified.

A container 6 is attached per sector 5 to an outer peripheral surface serving as a back surface side of the tread mold portion 1. The container 6 is attached to a lower surface of a side plate 7 structured so as to freely move up and down, in such a manner as to be slidable along the tire diametrical direction. A cone ring 8 is fitted to a rail 9 provided in an outer slant face of the container 6, and is structured such as to freely move up and down relatively with respect to the side plate 7.

In the mold clamping state shown in FIG. 1, if the container 6 is moved to the outer side in the tire diametrical direction by moving up the cone ring 8, each of the sectors 5 displaces to the outer side in the tire diametrical direction so as to separate from the side mold portions 2 and 3. If the side plate 7 and the container 6 are moved up further, the sector 5 and the side mold portion 3 are lifted up so as to give way to the mold open state. The transition from the mold open state to the mold clamping state can be achieved by carrying out the operation mentioned above inversely.

Although not being illustrated in the drawings, a rubber bag called a bladder is installed in an inner portion of the forming mold. At a time of the vulcanization forming, the outer surface of the tire is pressed to the inner surfaces of the tread mold portion 1 and the side mold portions 2 and 3, by inflating the bladder to the outer side in the tire diametrical direction. A rigid core can be used in place of the bladder, and the present invention can be applied both to a bladder vulcanization and to a core vulcanization.

Figure 3:
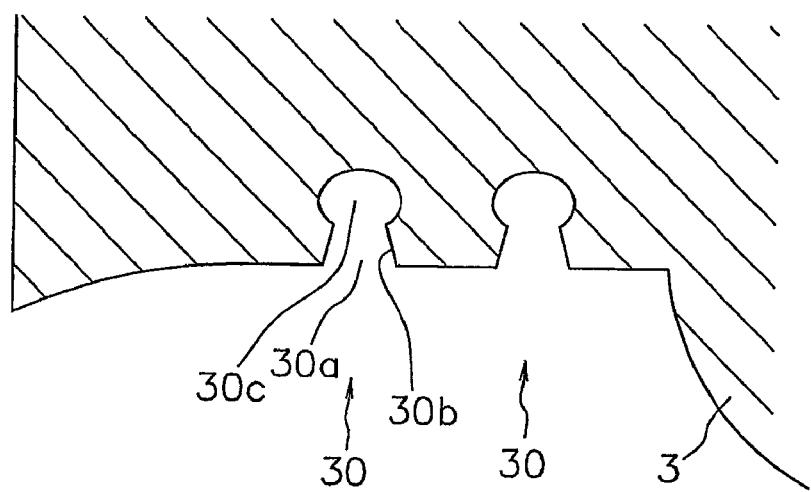
FIG. 3 is an enlarged view of a substantial part of the tire forming mold.

FIG. 3 is an enlarged view of a substantial part of the forming mold shown in FIG. 1, and shows a portion A in FIG. 1 in an enlarged manner. A rubber inflow portion 30 is provided in an inner surface of the side mold portion 3. In the example in FIG. 3, two rubber inflow portions 30 are provided. A rubber in an outer surface of the side wall portion of the unvulcanized tire is flowed into the rubber inflow portion 30 at a time of the vulcanization forming, and a protrusion portion corresponding to a shape of the rubber inflow portion 30 is formed in the outer surface of the tire after being vulcanized. Although details will be mentioned later, it is possible to form the tire in which letters and lines having different colors are formed in the side wall portion, by buff treating a part of the protrusion portion. The actual rubber inflow portion 30 extends in a near direction and a far direction in FIG. 3, and the protrusion portion of the tire is formed in such a manner as to come to the shape of the formed letters and lines, in the case of viewing from a tire axial direction.

A cross sectional shape of the rubber inflow portion 30 is constructed by a neck portion 30b extending from an inflow port 30a, and a head portion 30c enlarged from the neck portion 30b. It is preferable that a portion in which the neck portion 30b and the head portion 30c are coupled is formed in such a manner as to be rounded and be smoothly connected. In the example in FIG. 3, the neck portion 30b is formed such a shape as to be slightly narrowed toward the head portion 30c. Further, the head portion 30c is formed into an oval shape, however, the head portion 30c is not limited to the circular shape. Specifically, the head portion 30c may be formed into a quadrangular shape such as a trapezoid as shown in FIG. 4A. Further, the neck portion 30b may be parallel as shown in FIG. 4B, and any one of right and left sides of the head portion 30c may be larger than the neck portion 30b. In this case, taking into consideration a working property at a time of forming the rubber inflow portion 30 in the forming mold, it is preferable that the head portion 30c is formed into a round shape. In other words, in the case that the head portion 30c is larger than the neck portion 30b, it is preferable that the head portion 30c is formed into a round shape, since a cutting work by an end mill or the like becomes hard if an angular portion exists in the head portion 30c.

Figure 5:
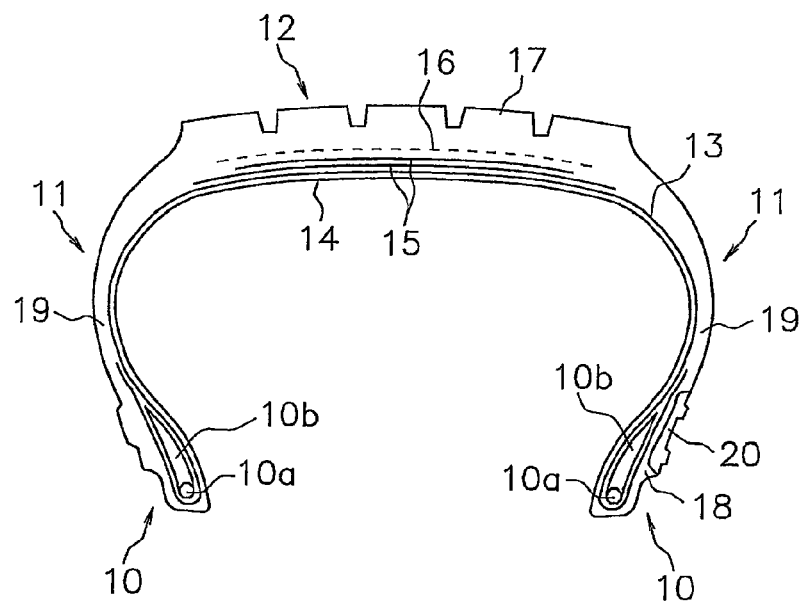
FIG. 5 is a tire meridian cross sectional view schematically showing an example of a pneumatic tire.
Figure 6:
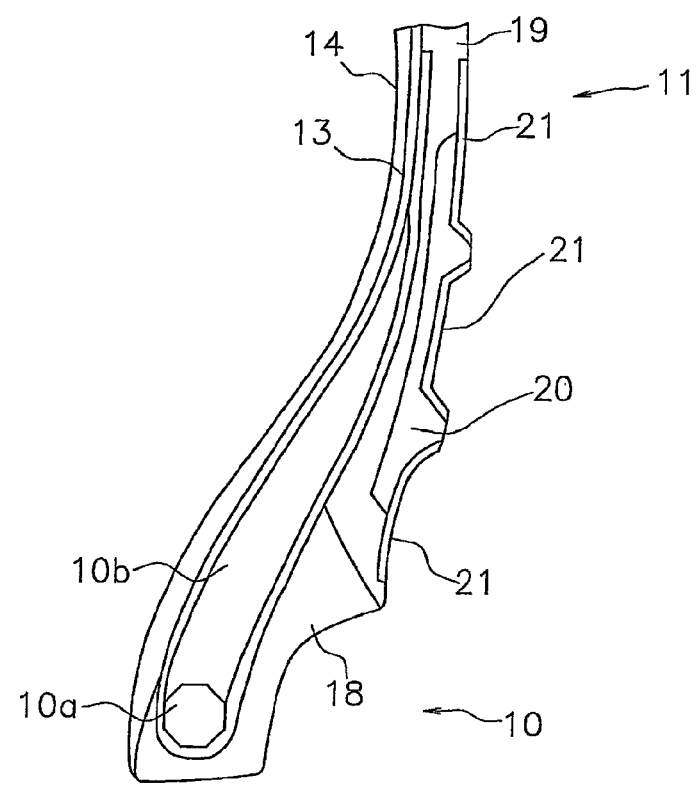
FIG. 6 is a substantial part cross sectional view showing a substantial part of the pneumatic tire in an enlarged manner.

FIG. 5 is a tire meridian cross sectional view schematically showing an example of the pneumatic tire according to the present embodiment. FIG. 6 is a substantial part cross sectional view showing the substantial part in an enlarged manner. The pneumatic tire is a radial tire which is provided with a pair of bead portions 10, a side wall portion 11 extending to an outer side in the tire diametrical direction from each of the bead portions 10, a tread portion 12 connected to an outer peripheral end of each of the side wall portions 11, and a carcass ply 13 arranged in such a manner as to be bridged between a pair of bead portions 10.

The bead portion 10 is provided with an annular bead core 10a which is formed by rubber coating a convergence body such as a steel wire, and an annular bead filler 10b which is positioned in an outer side in a tire diametrical direction of the bead core 10a and is made of a hard rubber having a triangular cross sectional shape. The carcass ply 13 is wound up in such a manner as to pinch the bead core 10a and the bead filler 10b so as to be locked in its end portion, and an inner liner rubber layer 14 for holding a pneumatic pressure is arranged in an inner side thereof. In the present embodiment, there is shown an example in which one carcass ply 13 is arranged, however, a plurality of carcass plies may be arranged so as to be laminated.

A belt layer 15 and a belt reinforcing layer 16 are arranged in an outer side of the carcass play 13 in the tread portion 12, and a tread rubber layer 17 is arranged in an outer side thereof. A rim protector 18 coming into contact with a rim flange at a time of being installed to a vehicle is arranged in an outer side of the carcass ply 13 in the bead portion 10. A side rubber layer 19 is arranged in an outer side of the carcass ply 13 in the side wall portion 11. For these rubber layers, a carbon black having a high reinforcing performance is generally used as filler, and they take on a black color.

A white rubber layer 20 (corresponding to the different color rubber layer) taking on a white color is arranged in the side wall portion 11 so as to be adjacent to an outer side of the side rubber layer 19. An outer side surface of the white rubber layer 20 is coated by a black thin cover rubber 21 (corresponding to the cover rubber layer), and a white letter or line is formed by grinding it so as to partly expose the white rubber layer 20. The white rubber layer 20 is not necessarily arranged in the side wall portions 11 in both sides, but is arranged only in a side (a right side in FIG. 5) serving as an outer side of the vehicle at a time of being installed to the vehicle in the present embodiment.

A rubber composition for forming the white rubber layer 20 is known, and a conventionally known rubber composition can be used without being limited. The carbon black is not used as the reinforcing material in the white rubber layer 20, and a metal oxide, for example, an alumina, a magnesia, a silica or the like is substituted. The white rubber layer 20 is softer and lower in rigidity than the side rubber layer 19, and a rubber hardness (a rubber hardness measured according to a durometer hardness test (type A) of JIS K6253) thereof is, for example, between 45° and 72°.

Figure 7:
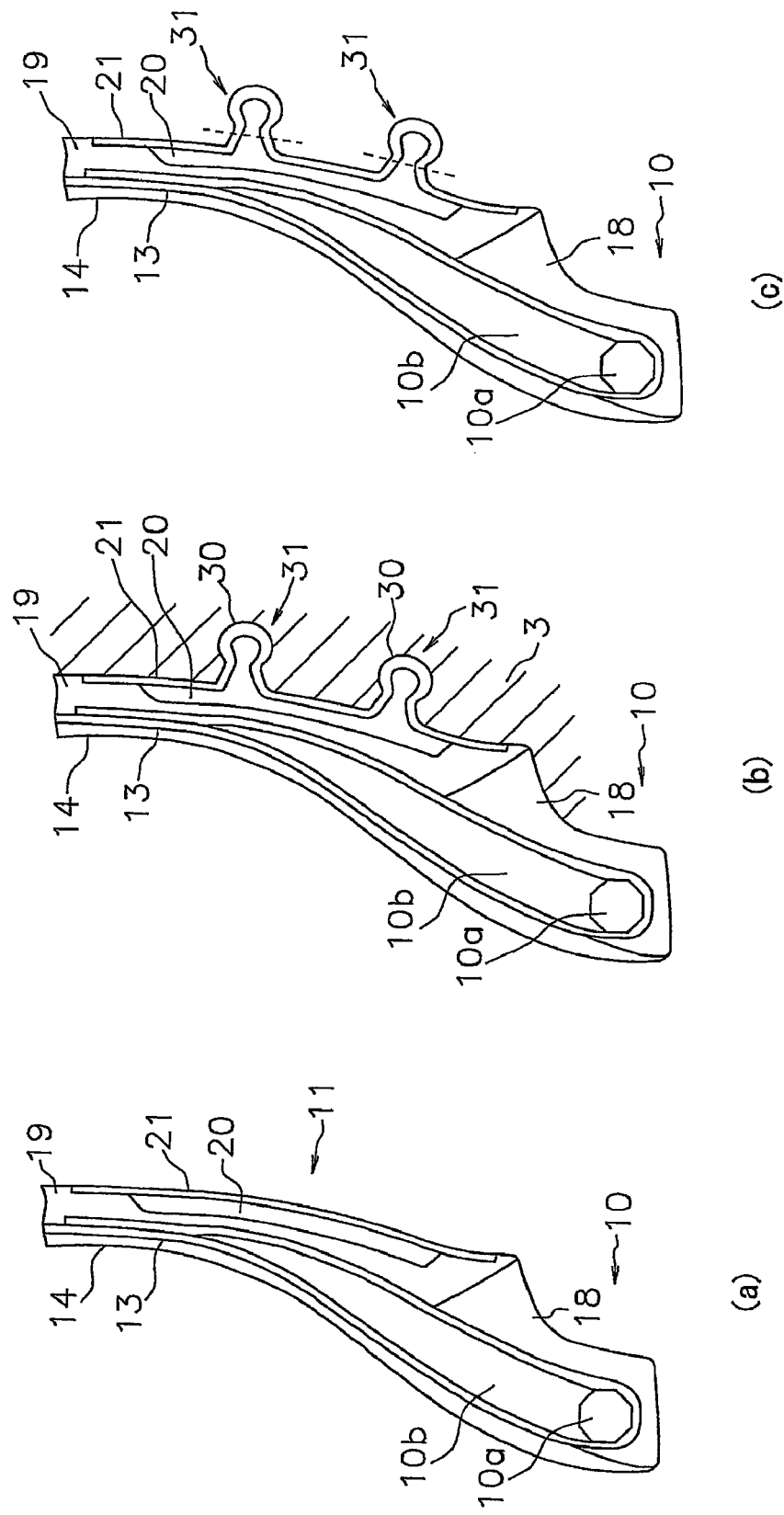
FIGS. 7A to 7C are explanatory views for explaining a tire forming method.

A method of vulcanization forming the unvulcanized tire by using the tire forming mold mentioned above, and forming the tire in which the white letters and lines are formed in the side wall portion 11 is as follows. FIGS. 7A to 7C show a state of forming the tire. FIG. 7A shows a state of the tire before being vulcanization formed. As shown in the drawing, the white rubber layer 20 and the cover rubber 21 of the side wall portion 11 are in a state in which they are laminated in the outer side of the side rubber layer 19, and the outer surface of the cover rubber 21 is formed into a substantially planer shape. Next, the unvulcanized tire is set in the forming mold and a mold clamping is carried out. Next, the outer surface of the tread portion 12 is brought into contact with the inner peripheral surface of the tread mold portion 1, as well as the outer surface of the side wall portion 11 of the tire is brought into contact with the inner surface of the side mold portion 3 (or the side mold portion 2), by inflating the bladder. Further, the forming mold is heated and held at a predetermined vulcanization temperature, and the vulcanization forming is applied to the unvulcanized tire in the inner portion. At this time, the white rubber layer 20 and the cover rubber 21 of the side wall portion 11 flow into the rubber inflow portion 30 provided in the inner surface of the side mold portion 3, as shown in FIG. 7B, and a protrusion portion 31 corresponding to the shape of the rubber inflow portion 30 is formed in the side wall portion 11. After the vulcanization forming, the vulcanized tire is picked up by opening the forming mold.

Finally, as shown in FIG. 7C, the tire in which the white letters and lines are formed in the side wall portion 11 can be formed by buff treating a leading end portion of the protrusion portion 31 of the vulcanization formed tire. The buff treated surface is a position (shown by a broken line in FIG. 7C) which is formed by the neck portion 30b of the rubber inflow portion 30, in the protrusion portion 31.

EXAMPLES

A description will be given below of an example specifically showing the structure and the effect of the present invention. The tire in which the white letters are formed was manufactured by using the tire forming mold according to the present invention and the conventionally known tire forming mold, and was evaluated. The evaluation was done based on whether or not the black cover rubber is left in the portion which comes to the white letter by right. Specifically, a size of the white rubber tire was set to 285/70R17, and one thousand of tires were manufactured.

Figure 8:
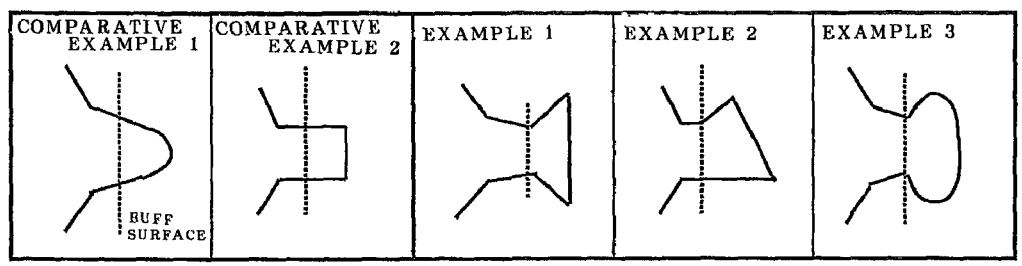
FIG. 8 is an enlarged view showing shapes of rubber inflow portions of tire forming molds according to an example and a comparative example.

FIG. 8 shows a shape of the rubber inflow portion of the used tire forming mold. As the tire forming mold according to the present invention, there were prepared tire forming molds respectively provided with a rubber inflow portion in which the head portion is formed into a trapezoidal shape (example 1), a rubber inflow portion in which the head portion is formed into a quadrangular shape (example 2), and a rubber inflow portion in which the head portion is formed into an oval shape (example 3). In this case, in the rubber inflow portion according to the example 1, it is preferable that the head portion is enlarged at an angle between 5° and 25° with respect to a direction which is vertical to a profile reference surface. If an angle of enlargement of the head portion is equal to or less than 5°, a volume of the head portion is insufficient, a volume of the white rubber falls short and the black cover rubber tends to be left. If the angle of enlargement of the head portion is equal to or more than 25°, there is generated such a problem that a working tool interferes with the forming mold. Further, it is preferable that the neck portion is narrowed at an angle between 10° and 15° with respect to the direction which is perpendicular to the profile reference surface toward the head portion. The tires were formed by the tire forming molds according to the examples 1 to 3, however, the black cover rubber was not left in the portion to be the white letter by right in all the tires formed by the tire forming molds.

On the contrary, in the case of using a tire forming mold provided with a conventionally known rubber inflow port (comparative example 1), the black cover rubber was left in the portion to be the white letter by right, in five tires of one thousand of formed tires. Further, in the case of using a tire forming mold provided with a rubber inflow port (comparative example 2) in which the neck portion and the head portion are formed as the same magnitude, the black cover rubber was left in the portion to be the white letter by right, in three tires of one thousand of formed tires.

What is claimed is:

1. A tire forming mold for vulcanization forming by being brought into contact with an outer surface of a tire which is provided with a side rubber layer of a first color arranged in an outer side of a carcass ply of a side wall portion, a different color rubber layer of a second color arranged in adjacent to an outer side of the side rubber layer, and a cover rubber layer of the first color arranged in adjacent to an outer side of the different color rubber layer, the tire forming mold comprising:
   a rubber inflow portion for forming a protrusion portion in an outer surface of the tire by inflowing the different color rubber layer and the cover rubber layer, in the contact surface with the tire, wherein
   a cross sectional shape of the rubber inflow portion is constructed by a neck portion extending from an inflow port, and a round, concave head portion that is enlarged from the neck portion, the neck portion becoming constantly narrower in a linear fashion in the direction of the head portion.

2. A tire forming mold for vulcanization forming by being brought into contact with an outer surface of a tire which is provided with a side rubber layer of a first color arranged in an outer side of a carcass ply of a side wall portion, a different color rubber layer of a second color arranged in adjacent to an outer side of the side rubber layer, and a cover rubber layer of the first color arranged in adjacent to an outer side of the different color rubber layer, the tire forming mold comprising:
   a rubber inflow portion for forming a protrusion portion in an outer surface of the tire by inflowing the different color rubber layer and the cover rubber layer, in the contact surface with the tire, wherein
   a cross sectional shape of the rubber inflow portion is constructed by a neck portion extending from an inflow port, and a head portion enlarged from the neck portion, wherein the head portion is enlarged at an angle between 5° and 25° with respect to a direction which is perpendicular to a profile reference surface and the neck portion is narrowed at an angle between 10° and 15° with respect to the direction which is perpendicular to the profile reference surface toward the head portion.

3. The tire forming mold according to claim 2, wherein the head portion is formed into a trapezoidal shape.

\* \* \* \* \*